Sept. 27, 1966 C. J. KETTLER 3,275,928
VOLTAGE REGULATOR WITH MAGNETIC AMPLIFIER ELEMENTS
Filed June 4, 1963
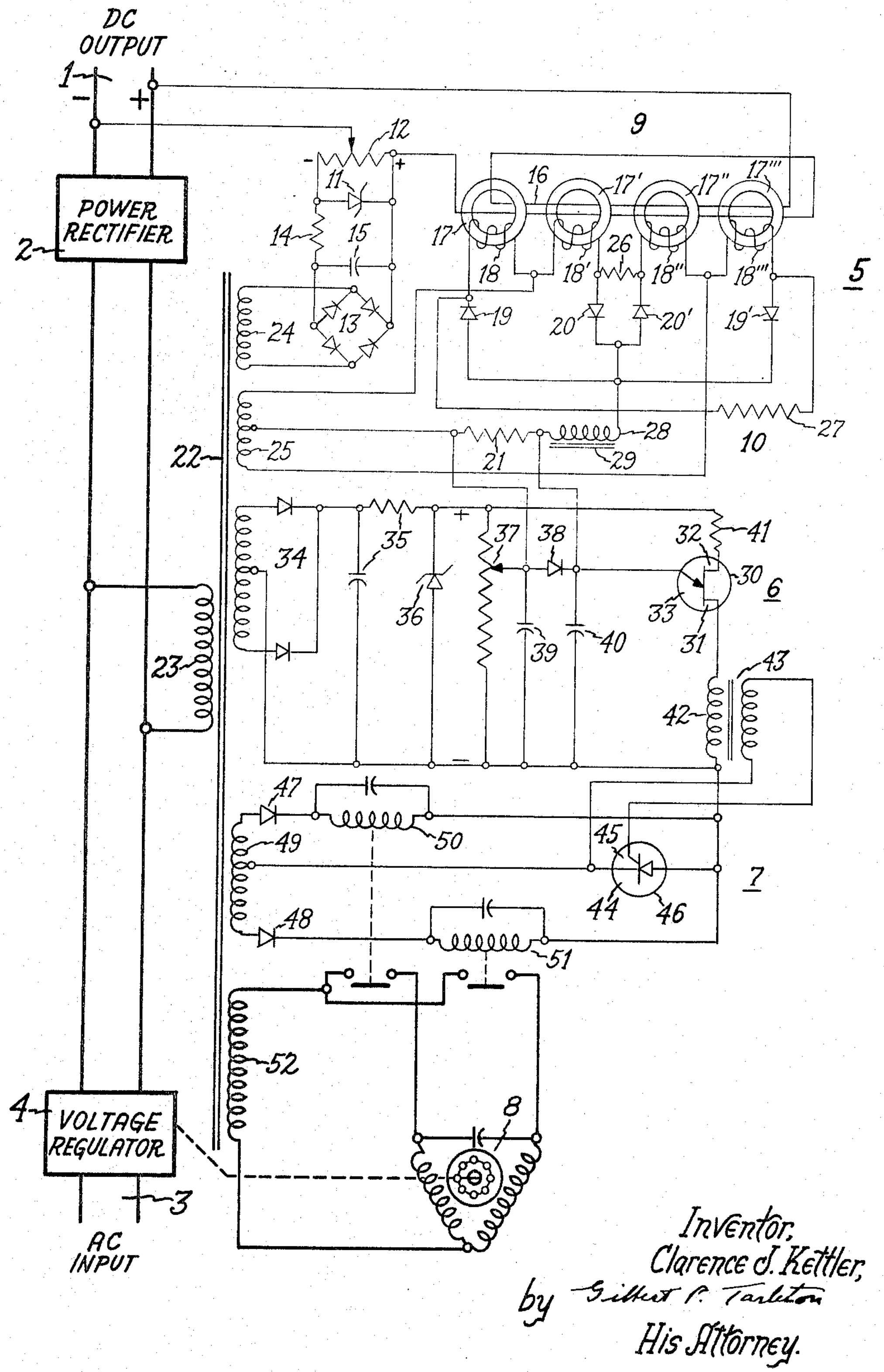
Inventor,
Clarence J. Kettler,
by Gilbert P. Tarleton
His Attorney.

United States Patent Office 3,275,928

Patented Sept. 27, 1966

3,275,928

VOLTAGE REGULATOR WITH MAGNETIC AMPLIFIER ELEMENTS

Clarence J. Kettler, Stockbridge, Mass., assignor to General Electric Company, a corporation of New York Filed June 4, 1963, Ser. No. 285,440
4 Claims. (Cl. 323—43.5)

This invention relates to control circuits and more particularly to a low input energy level sensor for automatic bidirectional dead band control systems.

A primary object of this invention is to provide novel low input energy level amplifier means for making a voltage responsive bidirectional dead band control system embodying solid state transistor type switching devices responsive to a primary signal, particularly a direct current null signal, whose magnitude increases from zero and whose polarity reverses with deviations above and below the desired value of the unidirectional voltage.

Briefly stated, this invention comprises a bidirectional saturable core reactor for amplifying in the form of phase controlled pulses a null type direct current error signal.

Other objects and advantages of the invention will be better understood from the following description taken in connection with the accompanying drawing and its scope will be pointed out in the appended claims.

Referring now to the single figure of the accompanying drawing, which illustrates diagrammatically a preferred embodiment of the invention, there is shown therein by way of example a direct current circuit 1 whose voltage is to be maintained substantially constant. This circuit may for example be the output circuit of a power rectifier 2 supplied from an alternating current input circuit 3 through a voltage regulator 4 of any suitable type such as a transformer type regulator of either the induction variety, the sliding brush variety, or the tap changing variety. The control system may be considered as consisting of three main parts, namely, an error sensing and amplified signal producing circuit 5, an intermediate amplifying and dead band controlling stage 6 having a unijunction transistor and a phase sensitive solid state switching device circuit 7 for controlling the direction of operation of a servomotor 8 for driving the regulator 4.

The principal features of novelty are in the subcircuit or module 5, and its relation to subcircuits 6 and 7, the latter per se being generally similar to what has previously been invented.

The module 5 in turn consists of two main elements, a null type error sensing circuit 9 and a full wave bidirectional differential saturable core amplifier 10. The circuit 9 which is connected across the D.-C. output circuit 1 of the power rectifier includes in series therewith a constant reference voltage producing means such, for example, as a zener diode 11 connected across a potentiometer or slide wire resistor 12 so that the voltage level of the system or regulator can be adjusted at will. The zener diode 11 is maintained in a broken down or spill-over condition by direct current supplied by a bridge connected rectifier 13 through an R-C filter 14–15. Also serially connected in the control circuit 9 is a control winding 16 for the amplifier 10.

With this arrangement, no current will flow in the control winding 16 when the voltage of the circuit 1 is at the predetermined normal value as determined by the setting of the slide wire resistor 12. However, deviations of the voltage of the circuit 1 above or below normal will cause current to flow in the control winding 16 whose polarity or direction is dependent on the direction of the deviation of the voltage of circuit 1 from normal.

The amplifier 10 comprises four magnetic circuits or cores 17, 17′, 17″, 17‴, all of which are linked by the control winding 16. These cores also are provided respectively with gate windings 18, 18′, 18″, 18‴. In addition, separate half wave or diode rectifier elements 19 and 19′ are respectively connected to the gate windings 18 and 18‴ and similar rectifier elements 20 and 20′ are respectively connected to the gate windings 18 and 18′. The remaining terminals of each of the rectifiers 19, 19′, 20 and 20′ are directly connected to a conductor having in series therewith a resistor 21. The rectifier 13 and the gate circuits of the amplifier 10 are energized, from a supply transformer core 22 having a primary winding 23 connected across the alternating output side of the voltage regulator 4 by means of separate secondary windings 24 and 25. The gate windings 18′ and 18″ are connected in series across the secondary winding 25 through the rectifiers 20 and 20′ similarly poled and in series. Likewise, the gate windings 18 and 18‴ are connected in series across the winding 25 through the rectifiers 19 and 19′ similarly poled and in series but with their polarity reversed with respect to the rectifiers 20 and 20′. In other words, during what may be termed positive half cycles of the voltage of the winding 25, current flows through the gate windings 18′ and 18″ and through the rectifiers 20 through 20′ in series, but no substantial current flows through the other gate windings and the other rectifiers because of the blocking action of the latter. However, during the alternate or negative half cycles of voltage of the winding 25 the reverse action takes place and current flows through the gate windings 18 and 18‴ in series through the rectifiers 19 and 19′, but no substantial current flows in the gate windings 18′ and 18″ and the rectifiers 20 and 20′ due to the blocking polarity of the latter.

However, so-called reset resistors 26 and 27 connected respectively across the rectifiers 20—20′ and 19—19′ permit a certain amount of current to flow through the gate windings in the direction blocked by the rectifiers so as to reset the magnetization of the cores 17 to 17‴ inclusive, and control their firing angles. The conductor from the common terminals or junction of the rectifiers 19—19′ and 20—20′ which contains the resistor 21 is connected to the midpoint of the secondary winding 25.

The operation of the module 5 is as follows. With the voltage of the D.-C. circuit 1 normal no current flows in the control winding 16 and no current flows in the resistor 21 because during positive half cycles of voltage of the winding 25 the current through the gate windings 18′ and 18″ and through the rectifiers 20 and 20′ bypasses the connection containing the resistor 21, and similarly during the negative half cycle the current through the gate windings 18 and 18‴ and through the rectifiers 19 and 19′ bypasses the resistor 21. This bypassing action is, of course, predicated on the fact that the characteristics of the cores and the gate windings are identical so that there is nothing to cause them to have different instantaneous magnetizing currents. The cores 17 through 17‴ and their respective gate windings are, however, so proportioned and the reset resistors 26 and 27 are so proportioned that the cores are driven to saturation at the 90 degree phase of their excitation so that slugs of current do circulate first through one pair of gate windings 18—18‴ and their rectifiers 19—19′ in series and then through the other pair of gate windings 18′—18″ and their rectifiers 20—20′ in series during alternate half cycles.

Gate windings 18 and 18‴ are so wound in relation to control winding 16 that equal currents in the former induce no net voltage in the latter. The same is true for gate windings 18′ and 18″.

If now a D.-C. current flows through the control winding 16 as a result of the departure of the voltage of the circuit 1 from normal it will advance the firing angle of one of the gate windings carrying current and retard the firing angle of the other gate winding carrying current so that over the intervening angle there will be a differential current which will flow in the resistor 21. During the next half cycle the same action will take place with respect to the other two gate windings which are then conducting current so that during those half cycles a differential current of short duration will flow through the resistor 21 but in the opposite direction. Inasmuch as practically no current is normally flowing through the resistor 21 these short duration pulses of current produce voltage spikes across the resistor 21 representing a very large percentage increase in voltage across the resistor 21. When the D.-C. current in the control winding 16 is reversed the polarity of the voltage spikes across the resistor 21 produced by the differential currents of the respective pairs of gate windings reverse.

A saturating reactor having a winding 28 on a core 29 is connected in the differential current circuit, i.e. in series with the resistor 21. This has been found useful in stabilizing the amplifier null, the principal reason being that a change in the supply voltage has a residual effect on the core reset balance. This reactor will absorb a fraction of a volt of imbalance so that the load resistor 21 presents no voltage drop until a true error signal appears.

The voltage pulses or spikes across resistor 21 are used to control the firing of a unijunction transistor 30, sometimes known in the art as a double base solid state diode, in the subcircuit 6. Such devices are well known in the art and as shown the unijunction transistor 30 comprises a first base 31 and a second base 32 and an emitter 33. A regulated source of unidirectional potential comprising a biphase rectifier 34 whose output is filtered by an R-C circuit 35 and whose output is regulated by a zener diode 36 serves to apply positive potential to the base 32 through a resistor 41 and negative potential to the base 31.

The emitter 33 has applied to it an intermediate unidirectional potential by means of a potentiometer 37, which is adjustable to set the bandwidth or dead band of the entire control system. This potential is applied through a diode 38, the resistor 21 being connected across this diode. The potentiometer 37 is set so that the bias on the emitter 33 is below the firing voltage for the unijunction transistor 30. If now the signal from the resistor 21 is added to the unidirectional bias the firing point of the unijunction transistor will be reached and the latter will fire thus discharging the capacitors 39 and 40 through the primary winding 42 of a pulse transformer 43.

The output of the pulse transformer 43 is applied between the cathode 44 and the gate 45 of a silicon controlled rectifier 46 whose anode-cathode circuit is in the neutral part of a biphase rectifier circuit consisting of separate diodes 47 and 48 energized by a midtapped supply winding 49 on the supply transformer 22. Thus the diodes 47–48 prevent current from flowing in their respective circuits except when the silicon controlled rectifier 46 fires and its firing is timed by the firing of the unijunction transistor 30 which in turn is timed by the phase of the alternate half cycle pulse signals from the part 5 of the system.

Control elements of any suitable type such as relays 50 and 51 are connected respectively in series with the diodes 47 and 48 and they in turn control circuits for energizing a reversible capacitor motor 8 in opposite directions from a suitable source of current supply such as a winding 52 on the supply transformer 22. The motor 8 drives the voltage regulator 4 in the direction to restore the voltage to normal.

The particular merit of the null circuit 9 is that normally it draws no current. Only when the regulated voltage departs from normal, i.e. is other than equal to the constant reference voltage provided by the zener diode 11 and potentiometer 12 does any control signal current flow. The particular merit of the bidirectional differential amplifier 10 is that it converts extremely small values of D.-C. current into extremely large percentage change alternate half cycle voltage spikes or pulses whose phase is determined by the polarity of the D.-C. signal current. That is to say, when the D.-C. current is of one polarity the voltage spikes occur during positive half cycles of the alternating current supply circuit and when the D.-C. current reverses the voltage spikes occur during the negative half cycles of the alternating current supply circuit. Due to the characteristics of the subcircuit 6 only spikes having additive polarity are effective, spikes of the opposite polarity being shortcircuited by diode 38.

The use of a pulse transformer 43 to drive the gate 45 of the silicon controlled rectifier 46 permits freedom in positioning grounds and in selecting the polarity directions of the circuit including diodes 47 and 48.

While there has been shown and described a particular embodiment of the invention, it will be obvious to those skilled in the art that changes and modifications may be made without departing from the invention, and therefore it is intended by the appended claims to cover all such changes and modifications as fall within the true spirit and scope of the invention.

What I claim as new and desire to secure by Letters Patent of the United States is:

1. In combination, an alternating current supply circuit, a regulator in said circuit for controlling its output voltage, means for producing voltage pulses comprising a four-core saturable reactor having a common control winding on all of its cores and a separate gate winding on each of its cores, means for energizing said control winding with unidirectional current whose magnitude is proportional to the magnitude of deviations of the output voltage of said supply circuit from a predetermined normal value and whose direction is dependent on the direction of said deviations, means for deriving from a pair of said gate windings differential current produced unidirectional voltage pulses during positive half cycles of the voltage of said supply circuit of a polarity depending on the direction of current in said control winding, said control winding being so polarized with respect to said separate gate windings that said means produce oppositely polarized voltage pulses during their respective active half-cycles for a given polarity of differential control current, means for deriving from the other pair of gate windings differential current produced unidirectional voltage pulses during negative half cycles of the voltage of said supply circuit of a polarity depending on the direction of current in said control winding, and means responsive to said voltage pulses of a common polarity only for controlling the direction of operation of said regulator by a phase differential effect depending on whether said common polarity pulses occur during alternate positive or alternate negative half cycles of the voltage of said supply circuit.

2. In combination, an alternating current supply circuit, a regulator in said circuit for controlling its output voltage, means for producing voltage pulses comprising a four-core saturable reactor having a common control winding on all of its cores and a separate gate winding on each of its cores, means for energizing said control winding with unidirectional current whose magnitude is proportional to the magnitude of deviations of the output voltage of said supply circuit from a predetermined normal value and whose direction is dependent on the direction of said deviations, means for deriving from a pair of said gate windings differential current produced unidirectional voltage pulses during positive half cycles of the voltage of said supply circuit of a polarity depending on the direction of current in said control winding and a magnitude depending on the magnitude of current in said control winding, said control winding being so polarized with respect to said separate gate windings that said means produce oppositely polarized voltage pulses during their respective active half-cycles for a given polarity of differential control current, means for deriving from the other pair of gate windings differential current produced unidirectional voltage pulses during negative half cycles of the voltage of said supply circuit of a polarity depending on the direction of current in said control winding and a magnitude depending on the magnitude of current in said control winding, and means responsive to said voltage pulses of a common polarity only for controlling the direction of operation of said regulator by a phase differential effect depending on whether said common polarity pulses occur during alternate positive or alternate negative half cycles of the voltage of said supply circuit.

3. In combination, an alternating current supply circuit, a regulator in said circuit for controlling its output voltage, means for producing voltage pulses comprising a four-core saturable reactor having a common control winding on all of its cores and a separate gate winding on each of its cores, means for energizing said control winding with unidirectional current whose magnitude is proportional to the magnitude of deviations of the output voltage of said supply circuit from a predetermined normal value and whose direction is dependent on the direction of said deviations, means for deriving from a pair of said gate windings differential current produced unidirectional voltage pulses during positive half cycles of the voltage of said supply circuit of a polarity depending on the direction of current in said control winding, said control winding being so polarized with respect to said separate gate windings that said means produce oppositely polarized voltage pulses during their respective active half-cycles for a given polarity of differential control current, means for deriving from the other pair of gate windings differential current produced unidirectional voltage pulses during negative half cycles of the voltage of said supply circuit of a polarity depending on the direction of current in said control winding, and means responsive to the arithmetical sum of an adjustable dead band determining unidirectional voltage and said voltage pulses of like polarity only for controlling the direction of operation of said regulator by a phase differential effect depending on whether said common polarity pulses occur during alternate positive or alternate negative half cycles of the voltage of said supply circuit.

4. In combination, an alternating current supply circuit, a regulator in said circuit for controlling its output voltage, means for producing voltage pulses comprising a four-core saturable reactor having a common control winding on all of its cores and a separate gate winding on each of its cores, means for energizing said control winding with unidirectional current whose magnitude is proportional to the magnitude of deviations of the output voltage of said supply circuit from a predetermined normal value and whose direction is dependent on the direction of said deviations, means for deriving from a pair of said gate windings differential current produced unidirectional voltage pulses during positive half cycles of the voltage of said supply circuit of a polarity depending on the direction of current in said control winding, means for deriving from the other pair of gate windings differential current produced unidirectional voltage pulses during negative half cycles of the voltage of said supply circuit of a polarity depending on the direction of current in said control winding, and means including a unijunction transistor responsive to the arithmetical sum of an adjustable dead band determining unidirectional voltage and said voltage pulses of like polarity only for controlling the direction of operation of said regulator depending on whether said pulses occur during alternate positive or alternate negative half cycles of the voltage of said supply circuit.

References Cited by the Examiner

UNITED STATES PATENTS

| | | | |
|---|---|---|---|
| 2,752,556 | 6/1956 | Webb et al. | 323—43.5 |
| 3,026,470 | 3/1962 | Webb | 323—43.5 |
| 3,123,763 | 3/1964 | Kettler | 323—43.5 X |
| 3,184,677 | 5/1965 | Jacobsen | 323—43.5 X |
| 3,202,903 | 7/1965 | Riebs | 323—43.5 |

JOHN F. COUCH, *Primary Examiner.*

LLOYD McCOLLUM, *Examiner.*

W. E. RAY, *Assistant Examiner.*